Nov. 29, 1966 G. L. ELLERY ET AL 3,288,394
MAGNETIC SIGNALLING DEVICE FOR
PNEUMATIC DISPATCH SYSTEM
Filed March 2, 1965 2 Sheets-Sheet 1
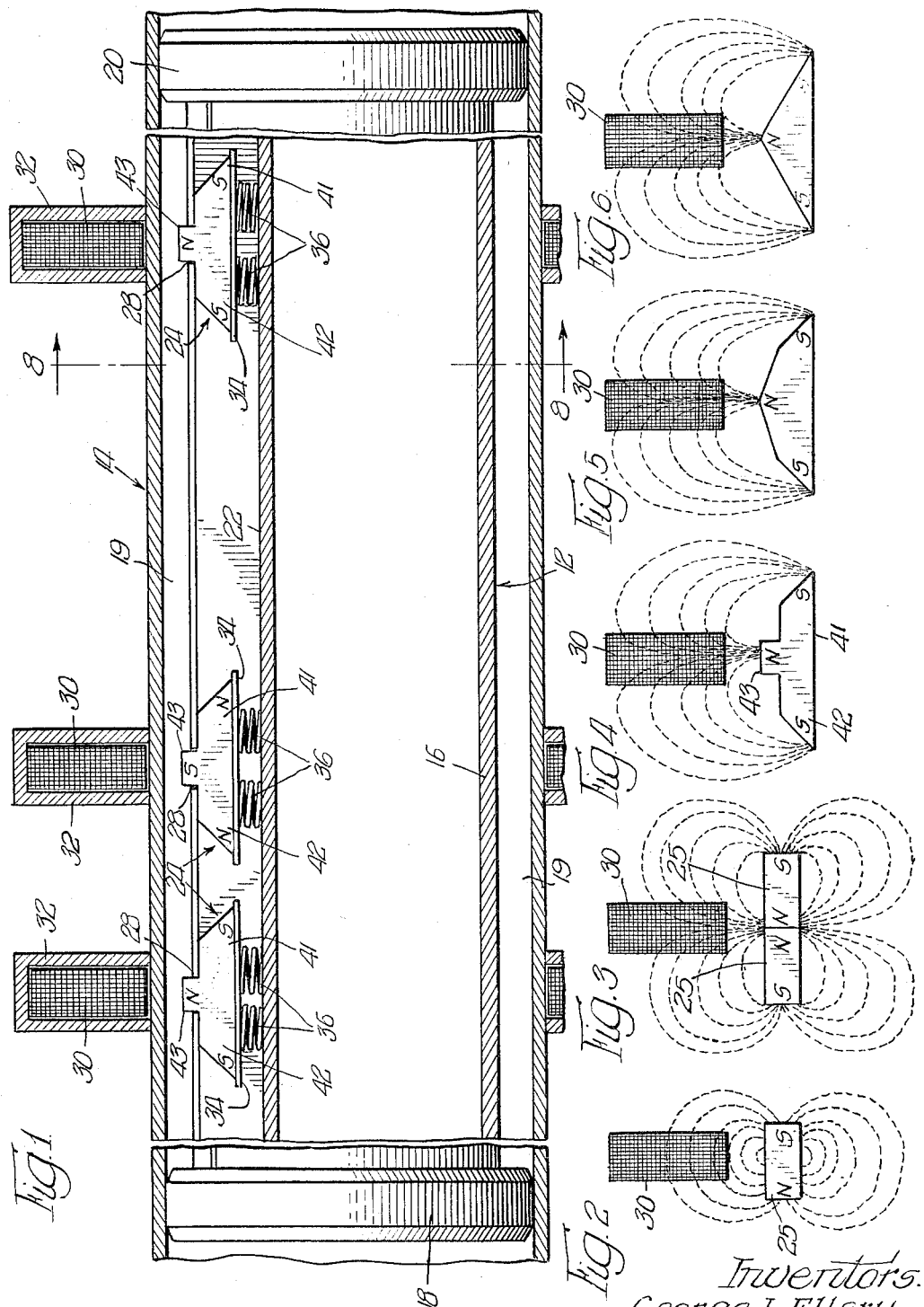
Inventors:
George L. Ellery,
Adam P. Weismuller,
By Hume, Groen Clement + Hume
Attys Nov. 29, 1966  G. L. ELLERY ET AL  3,288,394
MAGNETIC SIGNALLING DEVICE FOR
PNEUMATIC DISPATCH SYSTEM
Filed March 2, 1965  2 Sheets-Sheet 2
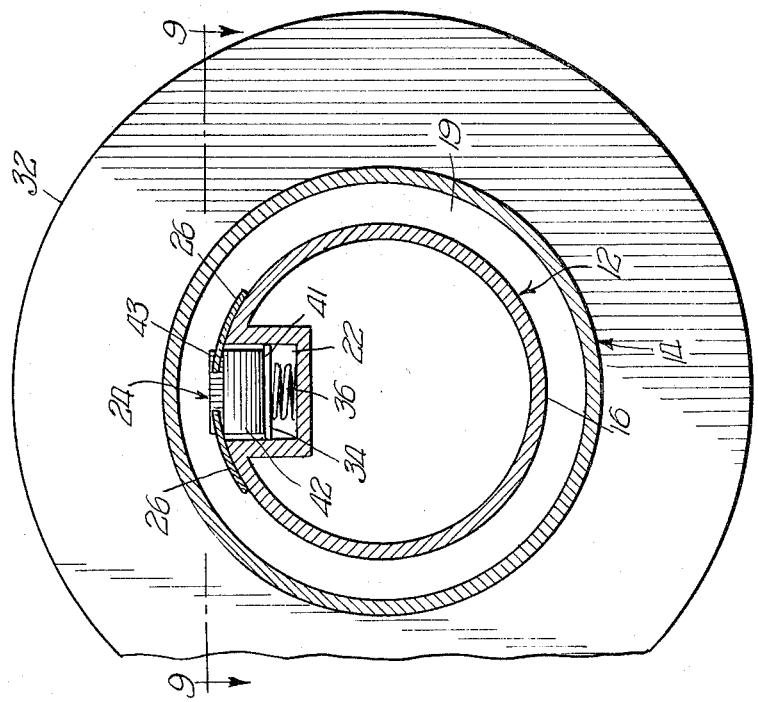
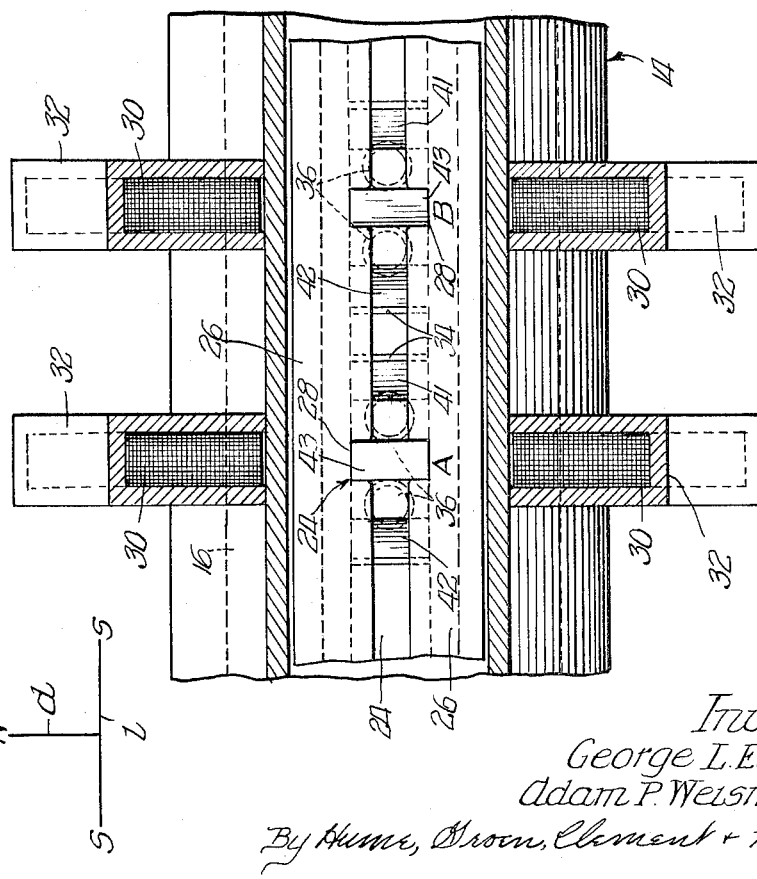
Inventors:
George L. Ellery,
Adam P. Weismuller,
By Hume, Brown, Clement & Hume.

United States Patent Office 3,288,394
Patented Nov. 29, 1966

3,288,394
MAGNETIC SIGNALLING DEVICE FOR
PNEUMATIC DISPATCH SYSTEM
George L. Ellery, Detroit, and Adam P. Weissmuller,
Livonia, Mich., assignors to The Grover Company,
Detroit, Mich., a corporation of Michigan
Filed Mar. 2, 1965, Ser. No. 436,463
6 Claims. (Cl. 243—16)

This invention pertains to a magnetic signalling device and in particular to an improvement for shaping the field created by the magnets so as to facilitate detection thereof.

Magnetic signalling devices are well known and one particular field in which they have been used to great advantage is that of pneumatic carriers. Specifically, the magnets are mounted on the carrier so that their fields may be detected by suitable receivers placed on the tube through which the carrier travels. Generally, the magnets are mounted so as to be adjustable whereby their spacing may be varied to preselected distances. These distances may be used to indicate the destination of the carrier. For example, see the patents to Chambers No. 1,983,342, and Hafner Nos. 2,900,146 and 2,970,791.

One of the problems in using magnets is the ability to generate on pneumatic carriers a field that may be readily detected by the receivers. However, this is not a case of merely selecting a bigger or stronger magnet. Specifically, it is desirable that the magnets have a relatively narrow field ("narrow" refers to the distance between the poles) so as to induce a pulse-like signal in the sensors that is of a relatively high amplitude but short time duration. In this manner, as will be seen later on, the narrow field permits a greater number of recognizable positions of the magnets on the carrier than if the field were relatively broad. The greater number of positions in turn permits a greater number of receiving stations.

It will be noted that the carriers travel quite rapidly through the tubes so as to limit the time in which the magnet is in the proximity of the receiver. This in itself increases the difficulty of generating a signal which is sufficiently strong to trigger the sensing mechanism and to cause it to provide the desired results.

To further complicate the matter the magnets must be mounted on the carrier so as not to inhibit the movement of the latter through the tube in which it travels. This in turn means that the magnets are spaced from the interior wall of the tube and in turn the sensors mounted on the exterior wall thereof.

These problems are alleviated to a considerable degree by the magnetic signalling device disclosed in the copending application of David H. Thorburn, Serial No. 243,276, filed December 10, 1962, now Patent No. 3,229,921. The present invention provides a novel and distinct magnetic signalling device which constitutes a further advance in the solution of these problems.

It is an object of the present invention to provide a magnetic signalling device which presents a shaped magnetic field that is readily detectable, particularly for the size and strength of the magnet utilized.

It is a further object of the present invention to provide a magnetic signalling device which is especially adapted to be used in conjunction with pneumatic carriers.

A still further object of the present invention is to provide a three pole magnet configuration which presents a radially extended magnetic field from the pneumatic carrier whereby the lines of force within the field may be readily passed through sensor elements mounted on the carrier tube.

The invention may be broadly described as a magnetic signalling device which comprises a plurality of configurated magnets, each of which is a three pole magnet having two like poles spaced apart and a third unlike pole spaced a finite distance from a line joining the like poles. This relationship, as will be seen hereinafter, causes a distortion or more specifically an extension of the magnetic field. The field extension causes a greater number of lines of force to pass at right angles to the detecting device, thereby generating a stronger E.M.F. signal.

In the Thorburn application previously referred to, like poles of a pair of magnets are held in closely spaced or touching relationship. The present invention improves on the Thorburn invention by eliminating the demagnetizing effect due to the close proximity of like poles and by eliminating the production handling and assembly problems of positioning and maintaining two like poles in close proximity. Further, its presents a field of greater flux density and definition in the area of the unlike pole whereby the resultant electrical signal induced in the pickup coil is more sharply defined and more precisely indicative of the position of the center of the magnet.

The aforementioned features and objects of the invention will be apparent upon reading of the specification with reference to the following drawings.

In the drawings:

FIGURE 1 is a sectional view of the invention as used in conjunction with a pneumatic carrier system.

FIGURE 2 is a schematic view of a conventional bar magnet showing the field relative to a sensor coil.

FIGURE 3 is a schematic view of a prior art arrangement showing the field relative to a sensor coil.

FIGURE 4 is a schematic view of one preferred form of configurated magnet of the present invention showing the field relative to a sensor coil.

FIGURE 5 is a schematic view of another preferred form of configurated magnet of the present invention showing the field relative to a sensor coil.

FIGURE 6 is still another schematic view of another preferred form of configurated magnet of the present invention showing the field relative to a sensor coil.

FIGURE 7 is a diagrammatic view of the polar relationships of a configurated magnet of the present invention.

FIGURE 8 is a sectional view taken at 8—8 of FIGURE 1.

FIGURE 9 is a sectional view taken at 9—9 of FIGURE 8.

Although the invention will be described as used in conjunction with pneumatic carrier systems, it is to be understood that this is merely by way of example and not to be construed as a limitation. It will be apparent that the signalling device may be used in any type of system in which a magnetic field for purposes of signalling or the like is of utility. It will be further apparent that the various elements utilized in the construction of the invention and the carrier system with which it is associated may be constructed of any suitable materials that will permit them to perform in the intended manner.

Referring now to FIGURE 1 there is shown one form of the invention as mounted on a pneumatic carrier 12 which is passing through the conveyor tube 14. The conveyor system may be of any suitable type such as those shown in the aforementioned patents to Hafner and Chambers. Generally, the system will include one or more loops constructed of tubing 14, a plurality of dispatching and receiving stations depending from said loops, means for motivating air through the tube whereby a carrier inserted therein will be motivated in the direction of air movement. The system will further include a sensing means of some suitable type in which the carriers may be diverted from one loop to another or from a loop into any one of the receiving stations thereon. In this particular instance, the sensing means will be of the type adapted to receive a magnetic field and to generate signal which will actuate means for diverting the carrier. One form of sensor is an inductance coil in which the passing of a field therethrough will cause an electrical current to be generated.

The carrier unit comprises a substantially cylindrical member 16 having the ends 18 and 20. The ends 18 and 20 are only smaller than the interior diameter of the tube 14 by an amount sufficient to permit the carrier to pass. The member 16 is substantially smaller than the tubing so that when supported by the ends 18 and 20 there is an annular gap 19 between the member 16 and the tube 14. The gap 19 constitutes the clearance which permits the carrier to negotiate curves in the conveyor system. The carrier 16 is provided with an access opening (not shown) which generally will take the form of a small door that may be locked in a closed position but readily opened when desired. The purpose of the door is, of course, to permit insertion and withdrawl of materials, papers and the like that are to be conveyed by the carrier.

The carrier, specifically the tube 16, is provided with a slot 22 which extends axially thereof and in which are disposed the magnetic units generally denoted by the numeral 24. The slot 22 extends between the ends 18 and 20 but terminates short thereof. As can be seen in FIGURE 8 the slot 22 extends about one-fourth of the diameter across the tube 16. A pair of flange members 26 are mounted on the tube 16 so as to project over the slot 22. Thus the opening intermediate the flange members 26 is materially smaller than the width of the slot 22. The flange members 26 are provided with a plurality of slits 28 which provide means for detachably fixing the magnetic units in preselected positions, as will be seen later on.

On the exterior of a tube 14 are the sensor coils 30. The coils 30 may be annular in shape and can extend around the tube 14. The coils may be of a conventional construction of the type adapted to generate an electrical signal when the lines of force of a magnetic field are passed therethrough. The signal from the coil is in turn fed through a suitable circuit (not shown) which is adapted to actuate the various components in the carrier system for controlling the destination of a carrier. A magnetically permeable sheath 32 is mounted on each of the coils 30 in order to enhance the signal generated by the magnetic field. The coils 30 are spaced at preselected distances so that when a carrier passes thereby having magnets mounted thereon and spaced in an identical manner the three coils are triggered simultaneously. Generally, the circuits used in the construction and operation of such carrier systems operate on the principle that a simultaneous triggering of a plurality of coils is necessary before the circuit will make any change in the path of the carrier. For example, see the aforementioned patents to Chambers and Hafner.

It is well known that as a magnet passes adjacent a coil the lines of force of the former cut the latter to generate an E.M.F. The greater the number of lines of force and their density, the greater the E.M.F. Since the magnets on a carrier must be relatively small and are of necessity placed some distance away from the coils 30 because of the intervening tube 14 and the geometry of the carrier 12, to provide the necessary clearance it has been found that the signal is relatively weak compared to the magnitude of the field. Thus, it is readily apparent that with a conventional magnet a large portion of lines of force are not passed at right angles to the coil. This condition is depicted in FIGURE 2 wherein the field of a conventional bar magnet 25 is schematically illustrated relative to the coil 30. It is apparent from FIGURE 2 that due to the inherent spacing between the magnet and the coil 30 only a small portion of the magnetic field is brought into right angle contact with the coil 30. Thus a great many of the lines of force are not utilized or do not generate as much E.M.F., and the E.M.F. signal is inefficiently generated. Further, the broadly spread nature of the field in the vicinity of the coil 30 and the consequent lack of density of the field militate against the generation of a sharp, distinct signal.

Referring now to FIGURE 3, there is shown a schematic illustration of the field of a pair of bar magnets 25 with like poles abutting in accordance with the Thorburn application previously referred to. This arrangement causes a distortion of the magnetic field as shown such that the apex of the field occurs at a distance considerably farther from the magnets than would the field of a single bar magnet of the same sizes such as shown in FIGURE 2. A greater number of right angle lines of force are thus cut by the coil 30, and the increase in flux density in the vicinity of coil 30 produces a sharper, more distinct signal. However, this magnet arrangement is subject to the handling and demagnetizing difficulties earlier referred to. Moreover, it is seen that there is a duplicate inverted field present on the opposite side of the bar magnets 25 from the coil 30. The presence of this unused duplicate field reduces the quantity of flux passed through the coil 30.

Referring now to FIGURE 4, there is shown one form of configurated magnet 41 in accordance with the present invention. The magnet 41 comprises a unitary structure having a base portion 42 and a projecting portion 43. The magnet 41 is fabricated from a suitable material such as Alnico and polarized as three-pole magnet with two like poles located at opposite ends of the base portion 42 and a single unlike pole located in the projecting portion 43. Hence, the magnet 41 may be said to be polarized in the configuration of an inverted T as shown diagrammatically in FIGURE 7 wherein the single unlike pole (illustrated as a North pole) is disposed a distanced $d$ from a line 1 determined by the two like poles (illustrated as South poles).

Referring again to FIGURE 4, it is seen that this form of magnet configuration results in a distortion of the magnetic field as illustrated such that the apex of the field occurrs at a distance farther from a magnet arrangement of equal field strength in either FIGURE 2 or FIGURE 3. It should be noted that the inverse duplicate field found in both the FIGURE 2 and FIGURE 3 arrangements has been effectively eliminated by the configuration of magnet 14. Hence, the field strength of the center pole of the magnet 41 is more efficiently utilized. To further shape the magnetic field, the ends of the base portion 42 are preferably chamfered or beveled such that the outward surfaces of the like poles mutually incline toward the unlike pole as illustrated in FIGURE 4. This configuration directs the angle of the lines of flux to the magnet ends to minimize the E.M.F. generation of the end poles.

The extended field produced by the magnet 41 is more sharply peaked and defined as well as having a higher flux density in the vicinity of the sensor coil 30. Hence, the resultant signal induced in the sensor coil 30 is correspondingly greater in amplitude and more sharply defined. In particular, the E.M.F. signal is sharply peaked and, hence, more precisely indicative of the position of the center of the magnet 41.

In FIGURES 5 and 6, two other configurated forms of the magnet 41 are illustrated. The same three-pole inverted T relationship of FIGURE 10 is present in the FIGURES 5 and 6 magnet configuration and the significant characteristics of the magnetic fields in FIGURES 5 and 6 are substantially the same as those of FIGURE 4. In FIGURE 6, the base and projecting portions are not separately distinct.

Referring now to FIGURES 1, 8, and 9, it is seen that the magnetic units 24 are each composed of a configurated magnet 41 secured to a platform 34 by any suitable means. The platforms 34 are biased upwardly by spring members 36. The springs 36 bias the projecting portion 43 into the slits 28 so as to provide a detent which prevents inadvertent displacement of the magnet unit 24.

As can be seen in FIGURE 9, one of the flanges 26 is provided with a suitable scale or indicia so as to visually designate the slits 28. This arrangement facilitates the selection of the desired combination of positions for the magnetic units in order to send a carrier to a preselected destination. By way of example, the scale could correspond to the linear distance from one end of the carrier. In such arrangement, one unit could be positioned at the end with the other two being spaced therefrom at selected positions. When the carrier passes a sensor having coils arranged corresponding to the positions of the magnetic units, the sensor circuit would then be energized and in turn cause appropriate changes in the system. As illustrated in FIGURE 1, one or more of the magnets 41 may have its center pole 43 of opposite polarity from the other magnets 41 in order to provide an additional information parameter.

The magnetic units 24 may be moved by pressing the same downwardly in the slot 22 so as to disengage the projections 43 from the slits 28. The magnets may then be slid along the slot 28 to the desired position. The downward pressure is then relieved thus permitting the springs to force the magnets upwardly so that there is engagement between the projections 43 and the slits 28. In this manner it is possible to selectively position the magnetic units to any desired spacing which will correspond with one of the sensor units in the system. When the carrier passes that unit the magnets will simultaneously energize the sensor coils so as to trigger the associated circuit. As mentioned previously, the circuit will in turn actuate suitable means for directing the carrier to the preselected destination.

It will be noted that while the invention has been described with reference to a carrier utilizing three of the magnetic units that this is merely by way of example. Specifically, a greater or lesser number of the magnets may be used per carrier. Furthermore, the invention may be used in any environment in which a magnetic field is used for generating a signal.

The magnets may be of other shapes than those shown in FIGURES 4, 5 and 6 so long as they embody the requisite three-pole polarized configuration.

Although certain specific terminology and configurations have been utilized in the description of the invention, it is to be understood that this is primarily by way of example and not to be construed as a limitation. It will be apparent to those skilled in the art that modifications may be made within the scope of the claims without departing from the spirit of the invention.

What is claimed is:

1. In a signalling device for generating a signal in response to a sensed condition, the invention comprising means for sensing a magnetic field and a magnet for generating said magnetic field, said magnet being an integral multipole magnet having a pair of like poles spaced a finite distance apart and an unlike pole spaced a finite distance from a line joining said like poles, whereby the resultant magnetic field is shaped outwardly in a preselectedd direction.

2. In a pneumatic carrier of generally tubular configuration, the invention comprising an integral multipole magnet mounted externally on said pneumatic carrier intermediate its ends, said magnet having a pair of like poles spaced a finite distance apart and an unlike pole spaced a finite distance from a line joining said like poles whereby the resultant magnetic field is shaped outwardly in a preselected direction, said line joining said like poles being longitudinally oriented with respect to said carrier.

3. The invention defined in claim 2 wherein said unlike pole is located on a line substantially equidistant from said like poles.

4. In a pneumatic carrier of generally tubular configuration, the invention comprising an integral multipole magnet mounted externally on said pneumatic carrier intermediate its ends, said magnet having a base portion with like poles at opposite ends thereof and a central projecting portion with an unlike pole, said magnet being mounted on said carrier with said projecting portion oriented radially outwardly with respect to said carrier whereby the resultant magnetic field of said magnet extends radially outwardly from said carrier.

5. The magnet defined in claim 4 wherein the outward end surfaces of said base portion are mutually inclined toward said unlike pole.

6. In a pneumatic carrier system including a tubular conduit, a pneumatic carrier adapted to travel through said conduit, said carrier being of a substantially tubular construction closed at the ends and sensor means mounted at a preselected position on said conduit for detecting the presence of a magnetic field, the invention comprising at least one integral three-pole magnet movably mounted externally on said carrier for selective longitudinal positioning intermediate the ends of said carrier, said magnet having a base portion with like poles at opposite ends thereof and a central projecting portion having an unlike pole located on a line substantially equidistant from said like poles, said magnet being arranged with said projecting portion being oriented radially outwardly with respect to said carrier and said base portion being oriented such that said like poles are longitudinally aligned with respect to said carrier whereby the resultant magnetic field of said magnet is directed radially outwardly from said carrier toward said means so as to pass through said sensor means when said carrier travels past the same.

References Cited by the Examiner
UNITED STATES PATENTS

| | | | |
|---|---|---|---|
| 2,546,344 | 3/1951 | Levy | 317—201 |
| 2,875,410 | 2/1959 | Lamb | 317—201 |
| 2,927,253 | 3/1960 | Mittag. | |
| 3,095,262 | 6/1963 | Maish et al. | |

SAMUEL F. COLEMAN, *Primary Examiner.*